United States Patent
Malhotra et al.

(10) Patent No.: US 7,701,853 B2
(45) Date of Patent: Apr. 20, 2010

(54) METHOD FOR POLICING-BASED ADJUSTMENTS TO TRANSMISSION WINDOW SIZE

(75) Inventors: Richa Malhotra, Twente (NL); Ronald Van Haalen, Nijmegen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 881 days.

(21) Appl. No.: 11/239,737

(22) Filed: Sep. 30, 2005

(65) Prior Publication Data
US 2007/0076621 A1    Apr. 5, 2007

(51) Int. Cl.
*H04L 12/26* (2006.01)
(52) U.S. Cl. .................................................... 370/233
(58) Field of Classification Search ......... 370/229–236, 370/252, 253, 400, 401; 709/230–235
See application file for complete search history.

(56) References Cited

U.S. PATENT DOCUMENTS

| | | | | |
|---|---|---|---|---|
| 5,400,329 | A * | 3/1995 | Tokura et al. ................ | 370/232 |
| 6,370,114 | B1 * | 4/2002 | Gulicksen et al. ............ | 370/229 |
| 6,438,101 | B1 * | 8/2002 | Kalampoukas et al. ....... | 370/229 |
| 6,643,259 | B1 * | 11/2003 | Borella et al. ............... | 370/231 |
| 6,925,060 | B2 * | 8/2005 | Mangin ...................... | 370/237 |
| 6,934,251 | B2 * | 8/2005 | Ono ........................... | 370/229 |
| 7,054,317 | B1 * | 5/2006 | Jung et al. ................. | 370/395.1 |
| 7,068,606 | B1 * | 6/2006 | Ma et al. .................... | 370/236 |
| 7,526,552 | B2 * | 4/2009 | Gomez et al. ............... | 709/226 |
| 2002/0165754 | A1 | 11/2002 | Tang et al. | |
| 2003/0086413 | A1 * | 5/2003 | Tartarelli et al. ............ | 370/352 |
| 2004/0071086 | A1 * | 4/2004 | Haumont et al. ............. | 370/230 |

OTHER PUBLICATIONS

C. Akinlar et al., "QoS Management inResidential Gateways," In Proceedings of Joint International Conference on Wireless LANs and Home Networks (ICWLHN 2002) and Networking (ICN 2002), Networks, Atlanta, USA, Aug. 2002.
Heckmann, "The Token Bucket Allocation and Reallocation Problems," Dec. 2001, KOM Technical Report, all pages.
Kidambi, Jayakrishna, "Dynamic Token Bucket (DTB): A Fair Bandwidth Allocation Algorithm for High-Speed Networks," 1999, IEEE, all pages.
Sambit Sahu et al., "On Achievable Service Differentiation with Token Bucket marking for TCP," Jun. 2000, Proc. ACM SIGMETRICS'00, Santa Clara, CA, all pages.

* cited by examiner

*Primary Examiner*—Dmitry H Levitan
(74) *Attorney, Agent, or Firm*—Wall & Tong, LLP

(57) ABSTRACT

The invention includes a method for determining a window size for a connection. One method according to the invention includes determining a peak information rate for the connection, determining a round trip time for the connection, and determining the window size using the peak information rate and the round trip time. Another method includes determining a token bucket size of a token bucket in response to detecting a condition associated with the token bucket and determining the window size using the token bucket size. Another method includes determining a plurality of connection window sizes for each of a plurality of connections. In this embodiment, the connection window sizes are determined by distributing a total window size across the plurality of connections. A determined window size may be communicated to at least one of a sender of the connection, a receiver of the connection, and a policing module.

17 Claims, 5 Drawing Sheets

METHOD FOR POLICING-BASED ADJUSTMENTS TO TRANSMISSION WINDOW SIZE

FIELD OF THE INVENTION

The invention relates to the field of communication networks and, more specifically, to flow and congestion control.

BACKGROUND OF THE INVENTION

In general, the Transmission Control Protocol (TCP) is widely used for data communications over the Internet. A TCP sender maintains two variables at any point in time: 1) a flow control window (denoted "FWND") set by the TCP receiver and 2) a congestion control window (denoted "CWND") calculated by the sender based on acknowledgments and packet drops in the network path between the TCP sender and the TCP receiver. The TCP sender computes an active window size (denoted as WND) at any point in time by selecting the minimum of the flow control window and the congestion control window (WND =min{FWND,CWND}). The TCP sender sends WND packets within each round trip time (RTT). In accordance with existing TCP versions, the flow control window is supposed to be based on an estimation of the available bandwidth and RTT in the network for the TCP connection. Disadvantageously, since the bandwidth and RTT parameters continuously fluctuate in time, the TCP sender often sends more data than the network can support, thereby resulting in packet drops. The packet drops cause TCP to substantially reduce WND (i.e., by half), thereby reducing the transmission rate to a rate considerably less than the network can support.

In general, token bucket based policing is typically used to enforce service level agreements. If a customer agrees to pay for transmitting at a particular traffic rate the network operator providing delivery of the traffic ensures that the customer does not exceed the peak information rate (PIR). The PIR is a strict limit that is enforced by the network operator using a policing function. In particular, the incoming information rate is monitored. If the incoming information rate exceeds the PIR the additional packets above the PIR are dropped. In other words, as transmissions below the PIR are successful the WND is increased until the rate associated with the WND reaches the strict policing limit. Upon reaching the strict policing limit packets begin to be dropped. The packet drops cause TCP to substantially reduce the WND (i.e., by half for every drop), thereby causing a substantial reduction in the transmission rate. Since this process typically repeats continuously, TCP connections are unable to transmit at a rate equal to the PIR. In other words, the customer is paying for connections that transmit at the agreed PIR, the network operator provides enough bandwidth to support the agreed PIR, however, due to existing TCP dynamics the agreed PIR is never achieved. A current proposed solution is use of large bucket sizes to admit bursts of data; however, admission of such large bursts of data into the network requires extensive, expensive buffer space to accommodate the large data bursts.

SUMMARY OF THE INVENTION

Various deficiencies in the prior art are addressed through the invention of a method for determining an optimal window size for a connection. In one method according to one embodiment of the invention comprises determining a peak information rate for the connection, determining a round trip time for the connection, and determining the window size using the peak information rate and the round trip time. In one method according to one embodiment of the invention comprises determining a token bucket size of a token bucket in response to detecting a condition associated with the token bucket and determining the window size using the token bucket size. In one embodiment, the window size is communicated to endpoints of the connection and the policing module. In one method according to the present invention includes determining a plurality of connection window sizes for each of a respective plurality of connections. In this embodiment, the connection window sizes are determined by distributing a total window size associated with the plurality of connections across the plurality of connections.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of a Transmission Control Protocol (TCP)/Internet Protocol (IP); however, the present invention can be readily applied to other networks and network topologies. The present invention enables policing-based determination of transmission window size. The present invention provides a method for determining an optimum window size for a connection. The present invention provides a method for adjusting the window size from a current window size to the determined window size. In one embodiment, the connection is a TCP connection and the associated window size is a TCP window (WND) parameter.

In normal operation, TCP reacts to packet drops anywhere in an end-to-end data connection by reducing the TCP transmission rate (i.e., reducing the window size of the connection). In normal operation, however, reaction to packet drops resulting from policing behavior results in an actual transmission rate that is below the desired peak information rate. In order to maintain an actual information rate that is close to the peak information rate, the present invention prevents packet drops normally caused by policing performed in response to packet bursts. In accordance with methodologies of the present invention, prevention of packet drops normally caused by such policing is achieved by determining an optimum window size and adjusting the window size from a current window size to the optimum window size.

Figure 1:
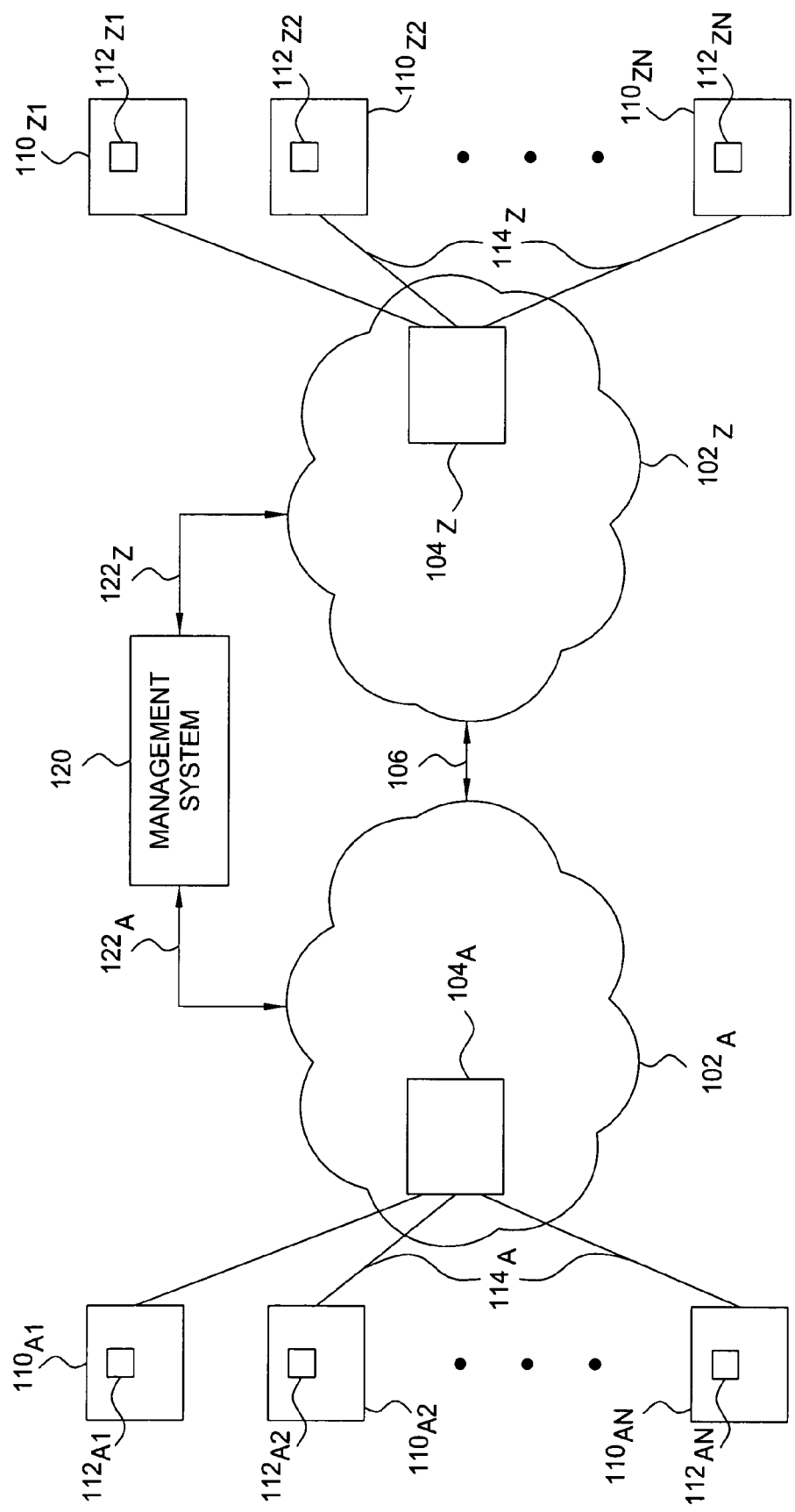
FIG. 1 depicts a high-level block diagram of a communications network architecture.

FIG. 1 depicts a high-level block diagram of a communications network architecture. In general, communications network architecture 100 of FIG. 1 comprises a TCP/IP communications network. In particular, communication network architecture 100 comprises a first $102_A$ and a second network $102_Z$ (collectively, networks 102). The first network $102_A$ includes an access node (AN) $104_A$ in communication with a plurality of terminal nodes (TNs) $110_{A1}$-$110_{AN}$ (collectively, TNs $110_A$) using a respectively plurality of access communication links (ACLs) $114_A$. The second network $102_Z$ includes an access node (AN) $104_Z$ in communication with a plurality of terminal nodes (TNs) $110_{Z1}$-$110_{ZN}$ (collectively, TNs $110_Z$) using a respectively plurality of access communication links (ACLs) $114_Z$. The ANs $104_A$ and $104_Z$ are collectively denoted as ANs 104. The TNs $110_A$ and $110_Z$ are collectively denoted as TNs 110.

As depicted in FIG. 1, networks 102 include any networks adapted for supporting TCP connections between TNs 110. For example, networks 102 may be IP networks. In one embodiment, although not depicted, networks 102 may include various other network elements, communication links, and the like. As depicted in FIG. 1, networks 102 communicate using a communication link 106. In one embodiment, although not depicted, communication between networks 102 may be performed using various combinations of networks, network elements, and associated communication links. As such, although not depicted, connections established between TNs 110 may traverse other networks, network elements, and communication links, as well as various combinations thereof.

As depicted in FIG. 1, ANs 102 comprise access nodes operable for supporting TCP connections between TNs 110. For example, ANs 104 may be routers adapted for routing TCP segments over IP networks using IP datagrams. Although not depicted, AN $104_A$ includes at least one policing module for policing traffic transmitted from TNs $110_A$ using AN $104_A$ and AN $104_Z$ includes at least one policing module for policing traffic transmitted from TNs $110_Z$ using AN $104_Z$. In one embodiment, not depicted, each direction of transmission associated with a connection between TNs 110 may include a plurality of associated policing modules.

As depicted in FIG. 1, TNs 110 comprise network elements adapated for exchanging information, and presenting the exchanged information using at least one display module. In one embodiment, in which the networks 102 comprise IP networks, TNs 110 include IP phones, computers, and the like. In one embodiment, TNs 110 comprise connection endpoints. For full-duplex connections established between TNs, each TN comprises an endpoint of the connection, operating as both a sender and receiver for the connection. The TN operates as a sender of information for data streams transmitted from the TN towards a remote TN. The TN operates as a receiver of information for data streams received by the TN from the remote TN.

For example, assume a TCP connection is established between TN $112_{A1}$ and TN $112_{Z2}$. In this example, TN $112_{A1}$ operates as a sender of the connection (for information transmitted from TN $112_{A1}$ to TN $112_{Z2}$) and a receiver of the connection (for information received by TN $112_{A1}$ from TN $112_{Z2}$). Similarly, in this example, TN $112_{Z2}$ operates as a sender of the connection (for information transmitted from TN $112_{Z2}$ to TN $112_{A1}$) and a receiver of the connection (for information received by TN $112_{Z2}$ from TN $112_{A1}$). As such, each connection endpoint operates as both a sender and a receiver of information.

As depicted in FIG. 1, TNs $110_{A1}$-$110_{AN}$ include a respective plurality of processes $112_{A1}$-$112_{AN}$ (collectively, processes $112_A$) and TNs $110_{Z1}$-$110_{ZN}$ include a respective plurality of processes $112_{Z1}$-$112_{ZN}$ (collectively, processes $112_Z$). The processes $112_A$ and $112_Z$ are collectively denoted as processes 112. The processes 112 are operable for establishing connections for transmission of data over the networks 102. In one embodiment, TCP connections may be established between processes 112. Since processes 112 terminate such TCP connections, the end-to-end flow control and congestion control functions of TCP are implemented between processes of terminal nodes between which a connection is established, respectively.

In general, TCP comprises a transport layer protocol for providing a connection-oriented, reliable, byte-stream service enabling communications between processes. Using TCP, processes wishing to communicate must establish a TCP connection with each other before exchanging data. In networks using TCP, processes communicating using a TCP connection communicate using TCP sockets (i.e., each side of a TCP connection includes a socket identified by <IP_address, port_number>). As such, two processes communicating over a network using TCP form a logical connection where the logical connection is uniquely identifiable by the sockets used by the sending process and the receiving process (i.e., by the combination of <local_IP_address, local_port, remote_IP_address, remote_port>).

Since TCP is a full duplex protocol, a TCP connection supports a pair of byte-streams (concurrent data streams flowing in each direction between connection endpoints). The TCP window size (WND) determines the amount of outstanding data (unacknowledged by the receiver) a sender may transmit on a particular connection before an acknowledgement is received from the receiver. For TCP, the window size is a number of bytes (not a number of TCP segments). A TCP flow-control mechanism associated with each of the byte-streams allows the receiver to limit the amount of data transmitted by the sender of the connection. A TCP flow-control mechanism requires initialization and maintenance of status information (e.g., socket information, sequence numbers, window sizes, and the like) for each data stream in a logical connection.

In general, from the viewpoint of the sender process and the receiver process communicating using a TCP connection, TCP transmits a contiguous stream of bytes using TCP segments and IP datagrams. At the sender side of the TCP connection, TCP performs segmentation of the byte-stream by grouping bytes from the byte-stream into TCP segments. The TCP segments are passed to IP encapsulation functions for transmission to the destination. In particular, data transmitted over a TCP connection is encapsulated in an IP datagram for transmission to a receiver over an IP network. At the receiver side of the TCP connection, TCP performs reassembly of the byte-stream from the TCP segments.

As depicted in FIG. 1, a management system (MS) 120 communicates with networks $102_A$ and $102_Z$ using management communication links $122_A$ and $122_Z$ (collectively, management links 122), respectively. As such, MS 120 is operable for communicating with networks 102, ANs 104, and, optionally, TNs 110. In one embodiment, at least a portion of the information for determining a window size for a connection is obtained from MS 120. In one embodiment, at least a portion of the methodologies of the present invention is performed by MS 120. For example, in one embodiment, peak information rate purchased by a customer is obtained from MS 120 using an associated service level agreement. For example, in one embodiment, MS 120 is operable for configuring a port associated with a connection such that a policing module associated with the connection is reconfigured.

Although a management system is depicted, in one embodiment, at least a portion of the methodologies of the present invention are performed by at least one of an endpoint of the connection, a policing module associated with the connection, and the like, as well as various combinations thereof. In one embodiment according to the present invention, the window size of a window associated with a connection is determined using policing information associated with the connection. Since policing information used for determining an optimum window size in accordance with the present invention may be obtained from policing modules associated with the connection, access nodes 104A and 104Z are depicted and described herein with respect to FIG. 2.

Figure 2:
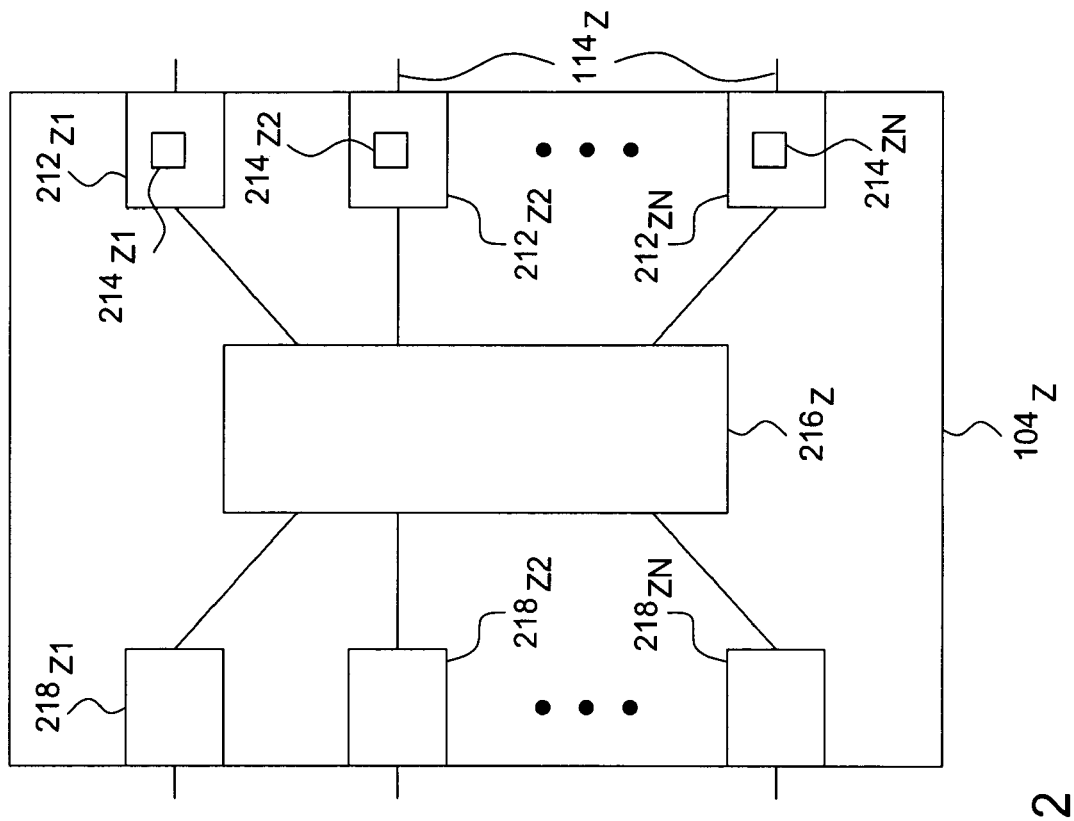
FIG. 2 depicts a high-level block diagram of the access nodes of the communication network architecture of FIG. 1.
Figure 2:
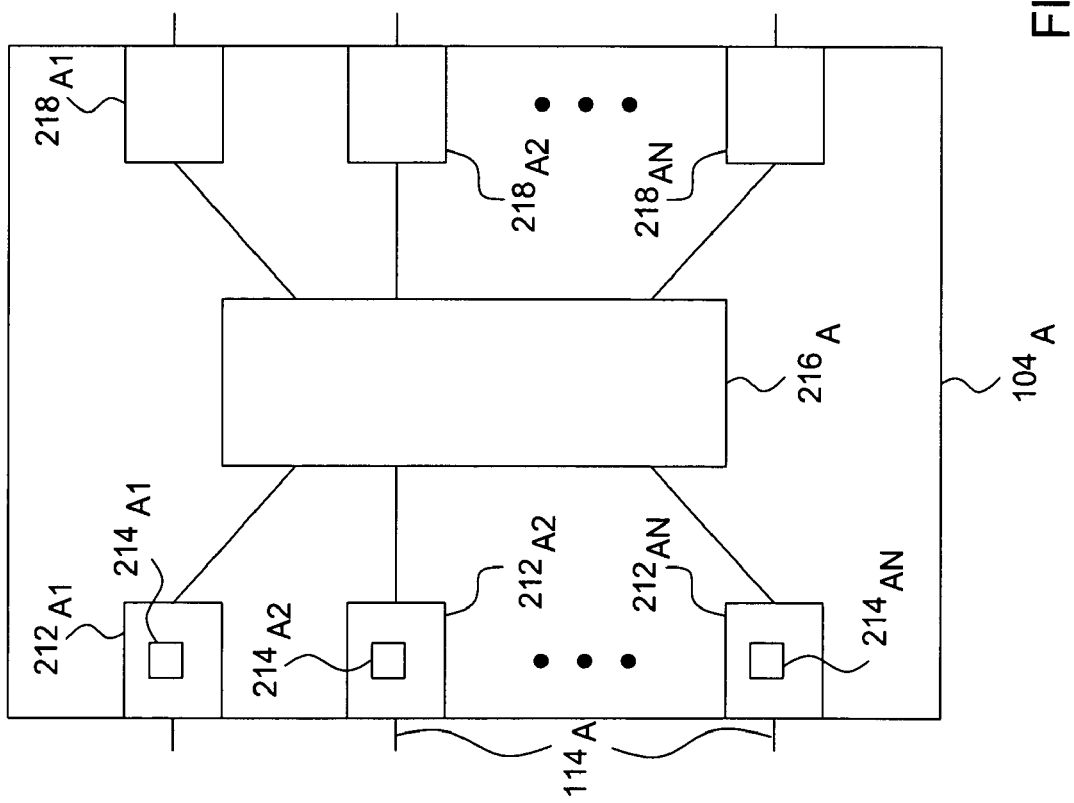

FIG. 2 depicts a high-level block diagram of the access nodes of the communication network architecture 100 of FIG. 1. As depicted in FIG. 2, access node $104_A$ comprises a plurality of ingress ports $212_{A1}$-$212_{AN}$ (collectively, ingress ports $212_A$) coupled to a plurality of egress ports $218_{A1}$-$218_{AN}$ (collectively, egress ports $218_A$) by a routing module $216_A$. As depicted in FIG. 2, access node $104_Z$ comprises a plurality of ingress ports $212_{Z1}$-$212_{ZN}$ (collectively, ingress ports $212_Z$) coupled to a plurality of egress ports $218_{Z1}$-$218_{ZN}$ (collectively, egress ports $218_Z$) by a routing module $216_Z$.

As depicted and described herein with respect to FIG. 1, ANs $104_A$ and $104_Z$ receive data from TNs $110_A$ and $110_Z$ using ACLs $114_A$ and $114_Z$, respectively, and transmit the data towards the networks 102. Similarly, as depicted and described herein with respect to FIG. 1, ANs $104_A$ and $104_Z$ receive data from the networks 102 and transmit the data towards TNs $110_A$ and $110_Z$, respectively. As such, as depicted in FIG. 2, ingress ports $212_A$ and $212_Z$ receive data from TNs $110_A$ and $110_Z$ using ACLs $114_A$ and $114_Z$, respectively, and transmit the data towards the networks 102. Similarly, as depicted in FIG. 2, egress ports $218_A$ and $218_Z$ receive data from the networks 102 and transmit the data towards TNs $110_A$ and $110_Z$, respectively.

As depicted in FIG. 2, ingress ports $212_{A1}$-$212_{AN}$ comprise a respective plurality of policing modules $214_{A1}$-$214_{AN}$ (collectively, policing modules $214_A$) and ingress ports $212_{Z1}$-$212_{ZN}$ comprise a respective plurality of policing modules $214_{Z1}$-$214_{ZN}$ (collectively, policing modules $214_Z$). The policing modules $214_A$ and $214_Z$ are collectively referred to as policing modules 214. In one embodiment, a policing module comprises a token bucket mechanism. In general, a token bucket may be used for enforcing a peak information rate. In one embodiment, since a peak information rate may be associated with a customer utilizing numerous connections, a token bucket associated with a port may be used for contemporaneously monitoring the peak information rate associated with a plurality of connections carried over the port.

In order to enforce the peak information rate, incoming traffic rate on a port is monitored using the token bucket. Upon forwarding of a packet, the number of tokens in the token bucket (i.e., token bucket size) is adjusted by the number of bytes in the packet. In one embodiment, in which the token bucket is initialized to zero, the token bucket size is increased in response to forwarding of a packet, and packets arriving at the port are forwarded as long as the token bucket size is less than a configured maximum bucket size. In another embodiment, in which the token bucket size is initialized to a maximum bucket size, the token bucket size is decreased in response to forwarding of a packet, and packets arriving at the port are forwarded as long as the token bucket is not empty (i.e., as long as the token bucket size is greater than zero).

In one embodiment, policing modules 214 are adapted in accordance with the present invention for determining a window size for a connection. In one further embodiment, policing modules 214 are adapted in accordance with the present invention for communicating the determined window size to an endpoint of the connection for use in adapting the transmission rate of the connection. In one embodiment, policing modules 214 are adapted in accordance with the present invention for providing policing information (e.g., current token bucket size, maximum token bucket size, detection of packet drop conditions, and the like, as well as various combinations thereof) to at least one endpoint of a connection for use in determining a window size for the connection.

Figure 3:
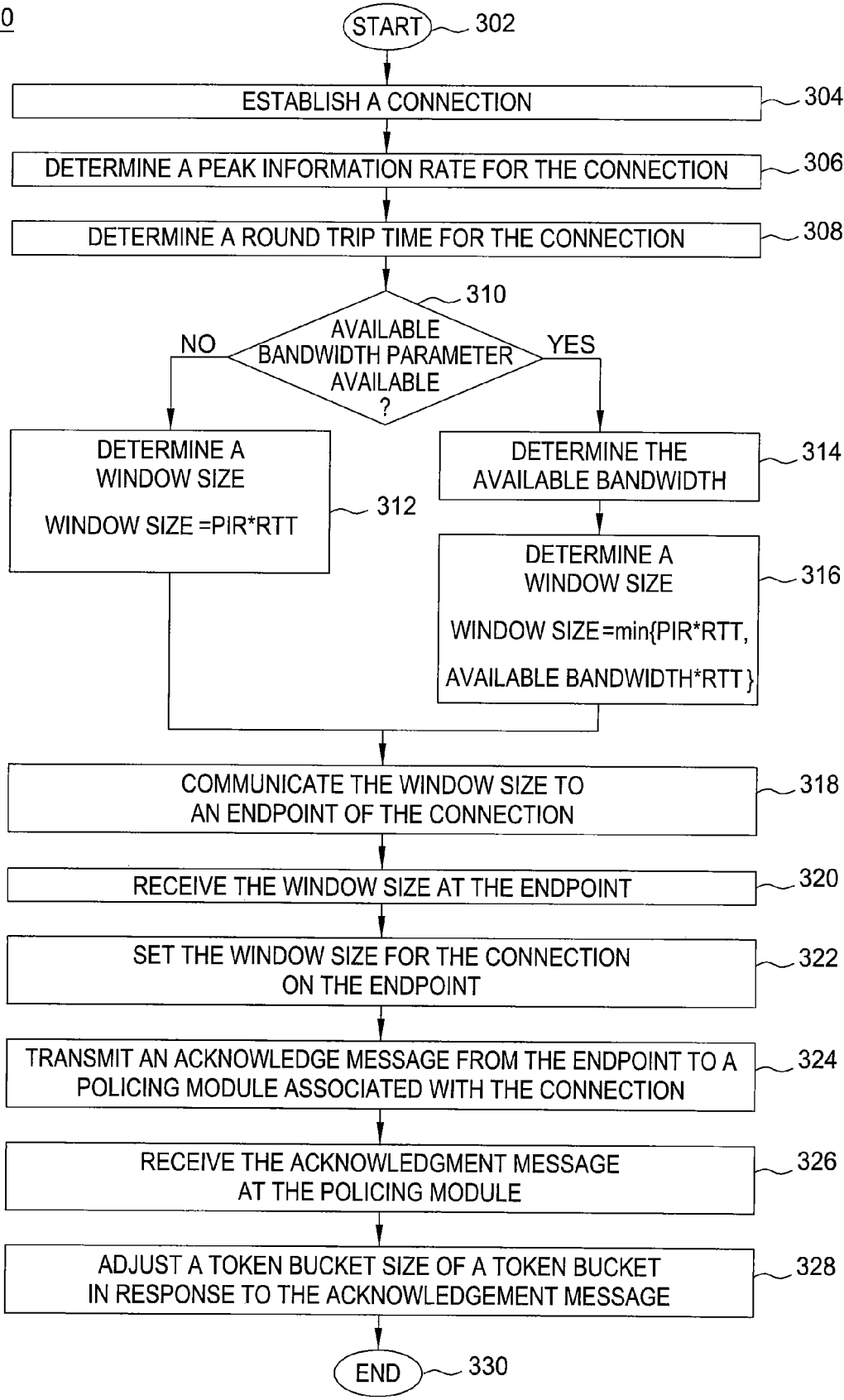
FIG. 3 depicts a flow diagram of a method according to one embodiment of the invention.

FIG. 3 depicts a flow diagram of a method according to one embodiment of the invention. Specifically, method 300 of FIG. 3 comprises a method for adjusting a window size for a connection. Although depicted and described with respect to adjusting a window size for a single connection, method 300 of FIG. 3 may be used for adjusting window sizes associated with a plurality of connections. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, a connection is established. In one embodiment, the established connection is a TCP connection. At step 306, an information rate parameter is determined for the connection. In one embodiment, the information rate parameter is a peak information rate (PIR). The PIR may be determined from any source (e.g., a management system). At step 308, a round trip parameter is determined for the connection. In one embodiment, the round trip parameter comprises a round trip time (RTT). The RTT may be determined using any means for determining a round trip time as known in the art. For example, RTT may be determined using at least one ping command. In other words, policing-based information (e.g., PIR, RTT, and the like) is determined for use in determining a window size for the connection.

At step 310, a determination is made as to whether an available bandwidth parameter is available. If the available bandwidth parameter is not available, method 300 proceeds to step 312. If the available bandwidth parameter is available, method 300 proceeds to step 314. In one embodiment, an assumption may be made that either the available bandwidth parameter is always available or the available bandwidth parameter is never available. In this embodiment, step 310 of method 300 is no longer required. Although not depicted, in this embodiment, if the available bandwidth parameter is never available, method 300 proceeds from step 308 directly to step 312 (and steps 314 and 316 are not performed). Similarly, although not depicted, in this embodiment, if the available bandwidth parameter is always available, method 300 proceeds from step 308 directly to step 314 (and step 312 is not performed).

At step 312, the window size for the connection is determined. In one embodiment, the window size is determined using an information rate parameter (e.g., PIR) and a round trip parameter (e.g., RTT). In one further embodiment, the window size is computed as a product of PIR and RTT (i.e., WND=PIR*RTT). At step 314, the available bandwidth for the connection is determined. At step 316, the window size is determined using at least one policing parameter and the available bandwidth. In one embodiment, the window size is determined using an information rate parameter (e.g., PIR), a round trip parameter (e.g., RTT), and the available bandwidth. In one further embodiment, the window size is computed as a minimum of (1) a product of the PIR and RTT and (2) a product of the available bandwidth and RTT (i.e., WND=MIN{PIR*RTT, AVAILABLE BANDWIDTH*RTT}). The method 300 proceeds from steps 312 and 316 to step 318.

At step 318, the window size is communicated to an endpoint of the connection. In one such embodiment, the window size is communicated to a sender of the connection. In one such embodiment, the window size is communicated to a receiver of the connection. At step 320, the window size is received by the endpoint of the connection. At step 322, the window size of the connection is set (i.e., the window size of the connection is adjusted from a current window size to the determined window size). At step 324, an acknowledgment is transmitted from the endpoint to a policing module associated with the connection. In one embodiment, the acknowledgment is transmitted using an acknowledgement message. In another embodiment, the acknowledgement message is included in a packet transmitted between endpoints of the connection.

At step 326, the acknowledgment is received at the policing module. At step 328, a token bucket size of a token bucket associated with the connection is adjusted in response to the acknowledgment. In one embodiment, the maximum token bucket size is increased in response to a determination that the acknowledgment indicates that the window size of the connection was increased. In one embodiment, the maximum token bucket size is decreased in response to a determination that the acknowledgment indicates that the window size of the connection was decreased. The method 300 then proceeds to step 330, where the method 300 ends.

As such, as depicted and described herein with respect to FIG. 3, the window size is determined by a policing module associated with the connection. For example, the window size for one direction of transmission of a connection between TN $112_{A2}$ and TN $112_{Z1}$, may be determined by policing module $214_{A2}$ on port $212_{A2}$ of AN $104_A$ for transmission of information from process $112_{A2}$ on TN $110_{A2}$ to process $112_{Z1}$ on TN $112_Z$. Similarly, for example, the window size for the other direction of transmission of the connection between TN $112_{A2}$ and TN $112_{Z1}$ may be determined by policing module $214_{Z1}$ on port $212_{Z1}$ of AN $104_Z$ for transmission of information from process $112_{Z1}$ on TN $110_{Z1}$ to process $112_{A2}$ on TN $112_{A2}$.

Figure 4:
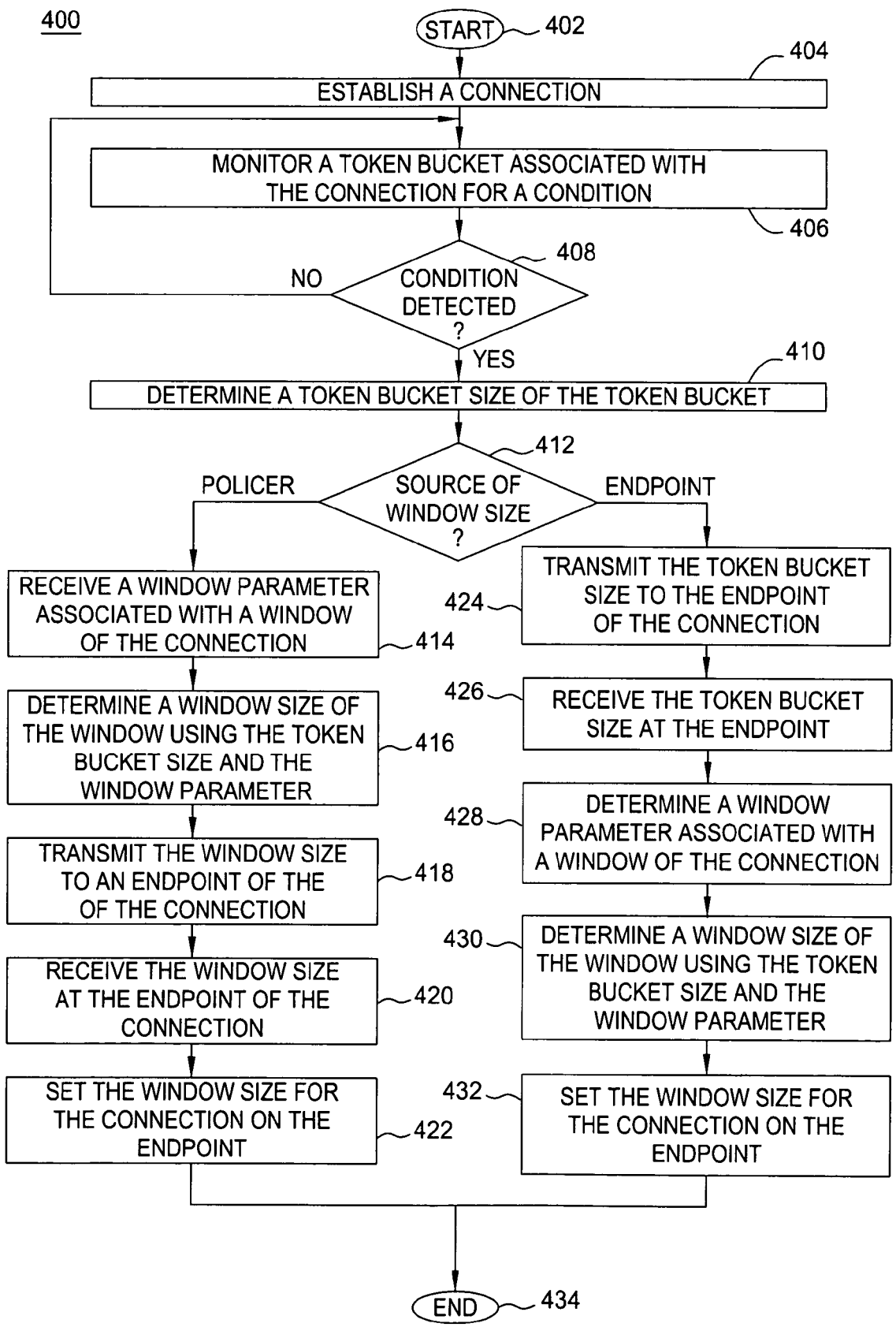
FIG. 4 depicts a flow diagram of a method according to one embodiment of the invention.

FIG. 4 depicts a flow diagram of a method according to one embodiment of the invention. Specifically, method 400 of FIG. 4 comprises a method for adjusting a window size for a connection. Although depicted and described with respect to adjusting a window size for a single connection, method 400 of FIG. 4 may be used for adjusting window sizes associated with a plurality of connections. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a connection is established. In one embodiment, the established connection is a TCP connection. At step 406, a token bucket associated with the connection is monitored for at least one condition. In one embodiment, the condition comprises a number of dropped packets for the connection crossing a threshold, being above a threshold, or being below a threshold. In one embodiment, the condition comprises a bandwidth utilization for the connection crossing a threshold, being below a threshold, or being above a threshold. At step 408, a determination is made as to whether the condition is detected. If a condition is not detected, method 400 returns to step 406 where method 400 continues to monitor the token bucket for a condition. If a condition is detected, method 300 proceeds to step 410.

At step 410, a token bucket size of the token bucket is determined. In one embodiment, the token bucket size comprises a maximum token bucket size. In one embodiment, the token bucket size comprises a current token bucket size. At step 412, a determination is made as to the source of the window size determination processing. If the window size of the connection is determined on a policing module of the connection, method 400 proceeds to step 414. If the window size of the connection is determined on an endpoint of the connection, method 400 proceeds to step 424.

In one embodiment, an assumption may be made that either the window size is always computed by the policing module or the window size is always computed by an endpoint. In this embodiment, step 412 of method 400 is no longer required. Although not depicted, in this embodiment, if the window size is always computed by the policing module, method 400 proceeds from step 410 directly to step 414 (and steps 324 through 432 are not performed). Similarly, although not depicted, in this embodiment, if the window size is computed by an endpoint, method 400 proceeds from step 410 directly to step 424 (and steps 414 through 422 are not performed).

At step 414, a window parameter associated with the window of the connection is received. In one embodiment, the window parameter comprises at least one of a window size parameter (e.g., a current window size), an information rate parameter (e.g., a PIR), a round trip parameter (e.g., a RTT), and like window parameters, as well as various combinations thereof. In one embodiment, the window parameter is received from an endpoint of the connection. At step 412, the window size for the connection is determined using the token bucket size and the at least one window parameter.

At step 418, the window size is transmitted to an endpoint of the connection. In one such embodiment, the window size is transmitted to a sender of the connection. In one such embodiment, the window size is transmitted to a receiver of the connection. At step 420, the window size is received by the endpoint of the connection. At step 422, the window size of the connection is set (i.e., the window size of the connection is adjusted from a current window size to the determined window size). The method 400 then proceeds to step 434, at which point the method 400 ends.

At step 424, the token bucket size is transmitted to an endpoint of the connection. At step 426, the token bucket size is received by the endpoint of the connection. At step 428, a window parameter associated with the window of the connection is determined. In one embodiment, the window parameter comprises at least one of a window size parameter, an information rate parameter, a round trip parameter, and like window parameters as described herein. At step 430, the window size for the connection is determined using the token bucket size and the at least one window parameter. At step 432, the window size of the connection is set (i.e., the window size of the connection is adjusted from a current window size to the determined window size). The method 400 then proceeds to step 434, at which point the method 400 ends.

Although not depicted, in one embodiment, monitoring of the token bucket for a condition continues throughout while the connection is active. As such, although not depicted as returning to step 406 following determination and adjustment of the window size, in one embodiment, the token bucket may be monitored continuously or periodically as the window size determination processing and adjustment steps (e.g., steps 410 through 432) are being performed in response to detection of a condition. In other words, another condition may be detected at the token bucket prior to completion of the adjustment of the window size of the connection triggered by a previously detected condition.

In one embodiment, the methodologies of the present invention may be used for effecting policing-based adjustments to transmission window size for a plurality of connections. In one embodiment, in which multiple connections are monitored by one token bucket, the computed transmission window size is divided over each of the connections. For example, assuming N connections, the optimal window size associated with each of the N connections is either [(PIR*RTT)/N] or [(MIN(PIR*RTT, AVAILABLE BANDWIDTH * RTT)/N). In one such embodiment, in which window size is an integer, remainders must be truncated or rounded, thereby resulting in a portion of the connections having a window size one greater than another portion of the connections.

Figure 5:
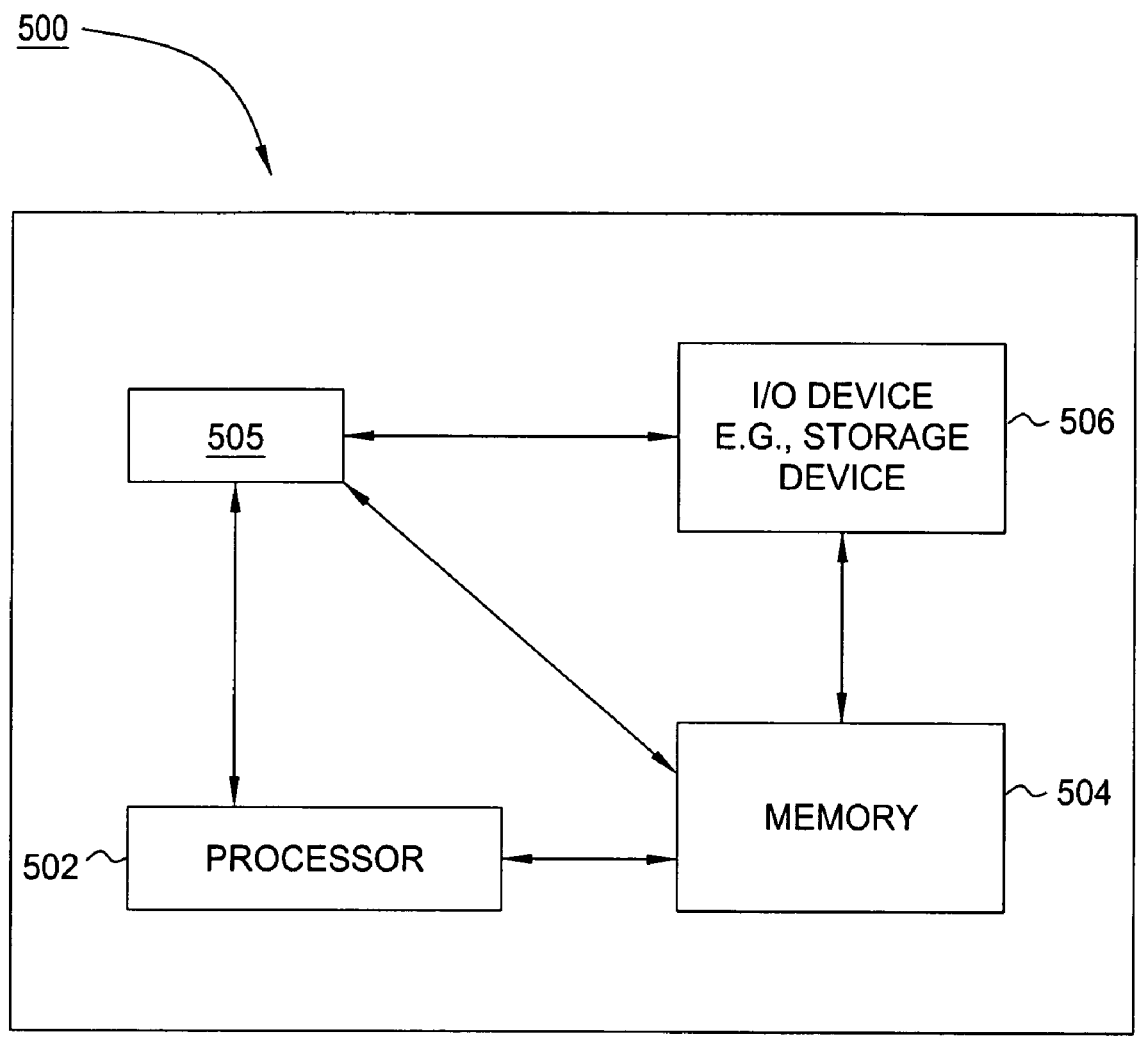
FIG. 5 depicts a high-level block diagram of a general-purpose computer suitable for use in performing the functions described herein.

FIG. 5 depicts a high-level block diagram of a general purpose computer suitable for use in performing the functions described herein. As depicted in FIG. 5, system 500 comprises a processor element 502 (e.g., a CPU), a memory 504, e.g., random access memory (RAM) and/or read only memory (ROM), a window size determination module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present window size determination module or process 505 can be loaded into memory 504 and executed by processor 502 to implement the functions as discussed above. As such, window size determination process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for determining a window size for a connection between a sender and a receiver, comprising:
    determining a peak information rate for the connection;
    determining an available bandwidth for the connection;
    determining a round trip time for the connection;
    computing a first product of the peak information rate and the round trip time;
    computing a second product of the available bandwidth and the round trip time; and
    determining the window size as a minimum of the first product and the second product;
    wherein the window size is determined by a network node adapted for policing the connection between the sender and the receiver.

2. The method of claim 1, further comprising:
    communicating the window size to at least one endpoint of the connection, the at least one endpoint comprising at least one of a sender of the connection and a receiver of the connection.

3. The method of claim 2, further comprising:
    receiving an acknowledgment message from the at least one endpoint of the connection; and
    adjusting a token bucket size of a token bucket associated with the connection in response to the acknowledgment message.

4. The method of claim 1, wherein the round trip time is determined by a policing function associated with the connection, wherein the round trip time is determined using a token bucket.

5. A method for controlling a window size for a connection between a sender and a receiver, comprising:
    determining, at a network node adapted for policing the connection using a token bucket, a window size for the connection, wherein determining the window size comprises:
        determining a peak information rate for the connection;
        determining an available bandwidth for the connection;
        determining a round trip time for the connection; and
        determining the window size using the peak information rate, the available bandwidth and the round trip time;
    propagating the window size toward at least one endpoint of the connection, wherein the at least one endpoint of the connection comprises at least one of the sender of the connection and the receiver of the connection;
    receiving an acknowledgment message from the at least one endpoint of the connection, wherein the acknowledgment message acknowledges receipt of the window size; and
    adjusting a token bucket size of the token bucket associated with the connection in response to the acknowledgment message.

6. The method of claim 5, wherein determining the window size comprises:
    computing a first product as a product of the peak information rate of the connection and the round trip time of the connection;
    computing a second product as a product of an available bandwidth for the connection and the round trip time of the connection; and
    selecting the window size as a minimum of the first product and the second product.

7. A method for controlling a window size for a connection between a sender and a receiver, comprising:
    monitoring a token bucket associated with the connection for a condition, wherein the token bucket is monitored at a network node adapted for policing the connection, wherein the condition comprises at least one of a number of dropped packets for the connection being above a first threshold or a bandwidth utilization for the connection being below a second threshold; and
    in response to detecting a condition associated with the token bucket, propagating information toward the sender of the connection, wherein the information is adapted for enabling the sender of the connection to adjust the window size for the connection.

8. The method of claim 7, wherein the information propagated toward the sender of the connection comprises information adapted for use by the sender of the connection to determine the window size for the connection.

9. The method of claim 8, further comprising:
    receiving the information at the sender of the connection;
    determining the window size for the connection using the received information; and
    adjusting the window size for the connection from a current window size to the determined window size.

10. The method of claim 7, wherein the information propagated toward the sender of the connection is the window size for the connection.

11. The method of claim 10, wherein the window size for the connection is determined using at least one window parameter, wherein the at least one window parameter comprises at least one of a current window size of the connection, a peak information rate of the connection, and a round trip time of the connection.

12. A method for determining a window size for a connection, comprising:

receiving a current window size associated with the connection, wherein the current window size is received by a network node comprising a token bucket associated with the connection, wherein the current window size is received from a sender of the connection;

in response to receiving the current window size, monitoring the token bucket associated with the connection; and in response to detecting a condition associated with the token bucket, determining an updated window size for the connection using the current window size associated with the connection.

13. The method of claim 12, where the condition comprises at least one of a number of dropped packets for the connection being above a first threshold or a rate utilization for the connection being below a second threshold.

14. The method of claim 12, wherein determining the window size for the connection using the current window size associated with the connection comprises:

decreasing the current window size if monitoring of the token bucket for the connection indicates that packets are being dropped; and increasing the current window size if monitoring of the token bucket for the connection indicates that at least a portion of the available bandwidth of the connection is unutilized.

15. The method of claim 14, wherein the at least one window parameter comprises at least one of a current window size of the connection, a peak information rate of the connection, and a round trip time of the connection.

16. The method of claim 12, further comprising:

transmitting the updated window size to a sender of the connection;

receiving the updated window size at the sender of the connection; and adjusting, at the sender of the connection, from using the current window size for the connection to using the updated window size for the connection.

17. A method for determining a plurality of connection window sizes for each of a respective plurality of connections, comprising:

determining a peak information rate for the plurality of connections;

determining a round trip time for the plurality of connections;

determining a total window size using the peak information rate and the round trip time; and determining the plurality of connection window sizes by distributing the total window size across the plurality of connections;

wherein the connection window sizes are determined by a network node configured for policing the connections using a single token bucket.

* * * * *